(12) United States Patent
Tsutsui et al.

(10) Patent No.: US 7,201,075 B2
(45) Date of Patent: Apr. 10, 2007

(54) ELECTRIC POWER STEERING APPARATUS

(75) Inventors: Takashi Tsutsui, Kashiwara (JP); Masayuki Watanabe, Uji (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/768,028

(22) Filed: Feb. 2, 2004

(65) Prior Publication Data
US 2004/0149512 A1 Aug. 5, 2004

Related U.S. Application Data

(62) Division of application No. 09/604,975, filed on Jun. 28, 2000, now Pat. No. 6,763,738.

(30) Foreign Application Priority Data
Jun. 28, 1999 (JP) .................................. 11-182525

(51) Int. Cl.
*F16H 35/00* (2006.01)
(52) U.S. Cl. ..................... 74/388 PS; 74/427; 384/536
(58) Field of Classification Search ............ 74/388 PS, 74/396, 427, 440; 384/535–537, 581–585, 384/519, 542, 434
See application file for complete search history.

(56) References Cited

U.S. PATENT DOCUMENTS

| | | | |
|---|---|---|---|
| 1,072,282 A | | 9/1913 | Waninger |
| 1,453,239 A | * | 4/1923 | Dostal .......................... 384/581 |
| 1,879,357 A | * | 9/1932 | Lindsrom .................... 384/581 |
| 2,109,053 A | * | 2/1938 | Searles ........................ 384/536 |
| 3,061,386 A | * | 10/1962 | Dix et al. .................... 384/535 |
| 3,268,268 A | | 8/1966 | Schwalm |
| 3,428,372 A | * | 2/1969 | Keller et al. ................ 384/536 |
| 3,848,477 A | | 11/1974 | Giandinoto et al. |
| 3,910,510 A | * | 10/1975 | Danberg ................... 241/189.1 |
| 3,976,340 A | * | 8/1976 | Pitner ......................... 384/581 |
| 4,040,307 A | * | 8/1977 | Koster ......................... 74/425 |
| 4,683,770 A | | 8/1987 | Nettmann |
| 4,885,948 A | | 12/1989 | Thrasher, Jr. et al. |
| 4,993,277 A | | 2/1991 | Adam et al. |
| 5,044,789 A | * | 9/1991 | Damon et al. ............... 384/581 |
| 5,186,068 A | | 2/1993 | Heller |
| 5,439,299 A | * | 8/1995 | Havens ........................ 384/542 |
| 5,605,071 A | | 2/1997 | Buchanan, Jr. |

(Continued)

FOREIGN PATENT DOCUMENTS

EP 0 420 131 A1 4/1991

(Continued)

*Primary Examiner*—Richard Ridley
*Assistant Examiner*—James Pilkington
(74) *Attorney, Agent, or Firm*—Birch, Stewart, & Kolasch & Birch, LLP

(57) ABSTRACT

An electric power steering apparatus having a displacing mechanism in which a fitting hole potion is provided to a gear housing for fitting with and holding a bearing to which a worm shaft for transmitting rotating force of a steering assisting motor to a steering shaft provided with a worm wheel is fitted, the portion being formed of a pair of split members formed by splitting the portion into two, one split member being movable toward the other split member to adjust a distance between a shaft center of the worm shaft and a rotation center of the worm wheel.

3 Claims, 9 Drawing Sheets

U.S. PATENT DOCUMENTS

| | | | |
|---|---|---|---|
| 5,777,411 A | | 7/1998 | Nakajima et al. |
| 5,794,480 A | | 8/1998 | Schonsteiner |
| 5,887,353 A | | 3/1999 | Beckingham |
| 6,016,716 A | * | 1/2000 | Mauro .......................... 74/409 |
| 6,044,723 A | * | 4/2000 | Eda et al. ............... 74/388 PS |
| 6,655,847 B2 | * | 12/2003 | Obara et al. ................. 384/535 |
| 6,805,017 B2 | * | 10/2004 | Chikaraishi et al. ..... 74/388 PS |

FOREIGN PATENT DOCUMENTS

| | | |
|---|---|---|
| EP | 0 666 210 A2 | 8/1995 |
| WO | WO 99/11502 A1 | 3/1999 |

* cited by examiner

ELECTRIC POWER STEERING APPARATUS

This application is a Divisional of application Ser. No. 09/604,975, filed on Jun. 28, 2000 now U.S. Pat. No. 6,763,738, the entire contents of which are hereby incorporated by reference and for which priority is claimed under 35 U.S.C. § 120; and this application claims priority of application Ser. No. 11-182525 filed in Japan on Jun. 28, 1999 under 35 U.S.C. § 119.

BACKGROUND OF THE INVENTION

The present invention relates to an electric power steering apparatus in which a motor is used as a source of a steering assist force.

Steering of an automobile is carried out by transmitting rotating operation of a steering wheel disposed within a vehicle room to a steering mechanism disposed on an outside of the vehicle room for steering wheels (front wheels, in general) for steering.

FIG. 1 is a sectional view of an electric power steering apparatus of prior art and FIG. 2 is a sectional view of a reduction mechanism and a motor portion.

As shown in FIG. 1, the electric power steering apparatus for the automobile has a first steering shaft 102 connected to a steering wheel 101, a torque sensor 105 for detecting steering torque based on a relative displacement between the first steering shaft 102 and a second steering shaft 104 connected to the first steering shaft 102 through a torsion bar 103 in a rotating direction, and the reduction mechanism 109 including a worm 107 and a worm wheel 108 for increasing a rotating force of a steering assisting motor 106 driven based on a detection result of the torque sensor 105 and for transmitting the rotating force to the second steering shaft 104. By means of the above constitution the electric power steering apparatus assists operation of the steering mechanism according to rotation of the steering wheel 101 by rotation of the motor 106 to reduce labor and a load imposed on a driver for steering.

Opposite end sides of the worm shaft 110 provided with the worm 107 and the second steering shaft 104 provided with the worm wheel 108 in shaft length directions are respectively supported by bearings 111, 112, and 113, 114 and movements of the shafts in diameter directions and the shaft length directions are prevented.

If the worm 107 and the worm wheel 108 are used as described above, a distance between rotation centers of the worm shaft 110 and the worm wheel 108 is preset in assembly. In this presetting, dimensional errors of the worm 107, the worm shaft 110, the bearings 111 and 112 for supporting the worm shaft 110, the worm wheel 108, the second steering shaft 104 for supporting the worm wheel 108, and the like cause variations in the distance between the rotation centers, backlash occurs after assembly, and noise due to the backlash is heard in the room of the automobile.

A meshing state changes with time because cogs of the worm 107 and the worm wheel 108 wear as a result of steering or because the worm wheel 108 made of synthetic resin contracts due to low temperatures during wintertime and the like and occurrence of the backlash is inevitable.

In order to reduce variations in the distance between the rotation centers in assembly, it is necessary to process parts such as the worm shaft 110, the bearings 111 to 114, the worm wheel 108, and the second steering shaft 104 with small dimensional errors, measure dimensions of all the parts, select the respective parts based on the measured dimensions, and assemble the parts. Therefore, costs of processing and assembly and cost of the entire electric power steering apparatus increase. Moreover, because the movements of the assembled worm shaft 110 and worm wheel 108 in directions intersecting the rotation centers are prevented, the distance between the rotation centers cannot be adjusted and the backlash cannot be adjusted when the meshing state has changed with time.

BRIEF SUMMARY OF THE INVENTION

It is an object of the present invention to provide an electric power steering apparatus in which the above problems can be solved.

In an electric power steering apparatus according to a first invention for transmitting rotating force of a steering assisting motor to a worm shaft having a worm and being rotatably supported in a gear housing through a bearing and to a steering shaft provided with a worm wheel meshing with the worm and for assisting steering, the electric power steering apparatus has a bearing case provided with a holding hole in which the bearing is fitted and held, and a mechanism for decentering the bearing toward the worm wheel.

In the first invention, because the bearing with which the worm shaft is fitted can be moved toward the worm wheel, it is possible to easily set a distance between rotation centers of the worm shaft and the worm wheel without being influenced by dimensional errors of parts such as the worm shaft and to reduce costs of processing and assembly of parts as compared with the above-described prior art. Moreover, because the bearing case has the decentering mechanism, it is possible to easily provide the decentering mechanism. Because the bearing can be decentered in a state in which the bearing is fitted and held in the holding hole of the bearing case, the distance between the rotation centers can be adjusted satisfactorily when a meshing state of the worm and the worm wheel changes with time due to increase in wearing amounts of cogs of the worm and the worm wheel or contraction of the worm wheel made of synthetic resin as a result of low temperatures during wintertime and the like.

In an electric power steering apparatus according to a second invention, the decentering mechanism has an inclined face formed on an inner peripheral face of the holding hole such that the holding hole is inclined with respect to the rotation center of the worm shaft, and has an inclined contact surface provided on an outer periphery of the bearing and comes in contact with the inclined face.

In an electric power steering apparatus according to a third invention, the contact surface is provided on the outer peripheral face of a ring member fitted with and fixed to the outer periphery of the bearing.

In the second and third inventions, because of a simple structure in which the holding hole of the bearing case is inclined and the inclined contact surface is provided in association with the bearing, the structure of the decentering mechanism can be simplified to further reduce the cost.

In an electric power steering apparatus according to a fourth invention, a pair of bearings with which opposite end portions of the worm shaft are fitted respectively are provided, one of the bearings is held in the bearing case, and an elastic member for energizing the worm shaft toward the one bearing is provided on a side of the other bearing.

An electric power steering apparatus according to a fifth invention further comprises a mechanism for adjusting a deflection amount of the elastic member from outside.

In the fourth and fifth inventions, is it possible to satisfactorily prevent rattling of the worm shaft in the shaft length direction when adjusting the distance between the rotation centers of the worm shaft and the worm wheel.

In an electric power steering apparatus according to a sixth invention, the bearing case has a fitting portion rotatably fitted with the gear housing around the holding hole and the decentering mechanism decenters the holding hole with respect to the center of the fitting portion.

In an electric power steering apparatus according to a seventh invention, the decentering mechanism has a mechanism for rotating the bearing case from outside and changes a position of the worm shaft supported by the bearing fitted and held in the holding hole with respect to the worm wheel by rotating the bearing case.

In the sixth and seventh invention, because the bearing can be decentered by rotating the bearing case, it is possible to easily adjust the distance between the rotation centers in assembly. Moreover, it is possible to easily adjust the distance between the rotation centers when the meshing state of the worm and the worm wheel changes with time due to wearing of cogs of the worm and the worm wheel as a result of steering or contraction of the worm wheel made of synthetic resin as a result of low temperatures during wintertime and the like.

In an electric power steering apparatus according to an eighth invention, a pair of bearings with which opposite end portions of the worm shaft are fitted are provided, one of the bearings is held in the bearing case, and an elastic member is provided between the other bearing and a fitting hole in which the other bearing is fitted.

In the eighth invention, it is possible to satisfactorily adjust the distance between the rotation centers if a deflection amount of the worm shaft increases.

In an electric power steering apparatus according to a ninth invention, the worm shaft is connected to an output axis of the motor through a universal coupling.

In the ninth invention, it is possible to satisfactorily adjust the distance between the rotation centers if the deflection amount of the worm shaft increases.

In an electric power steering apparatus according to a tenth invention for transmitting rotating force of a steering assisting motor to a worm shaft having a worm and being rotatably supported in a gear housing through a bearing and to a steering shaft provided with a worm wheel meshing with the worm and for assisting steering, a hole portion of the gear housing for fitting with and holding the bearing is formed of a pair of split members formed by splitting the portion into two along a longitudinal direction of the fitting hole, one split member being movable toward the worm wheel with respect to the other split member, a member for displacing the one split member to change a position of the worm shaft supported by the bearing with respect to the worm wheel, and an elastic member provided between the other split member and the bearing are provided.

In an electric power steering apparatus according to an eleventh invention, the displacement member has a member for connecting the pair of split members, and an energizing member disposed between the connecting member and the one split member and having elastic recovery force greater than elastic recovery force of the elastic member.

In an electric power steering apparatus according to a twelfth invention, the connecting member is a clamp screw.

In an electric power steering apparatus according to a thirteenth invention, a pair of bearings with which opposite end portions of the worm shaft are fitted respectively are provided, one of the bearings is held in the bearing case, and the other bearing is a double-row angular contact ball bearing.

In an electric power steering apparatus according to a fourteenth invention, the worm shaft is connected to an output axis of the motor through a universal coupling.

In the tenth to fourteenth inventions, because by operating the displacement member, it is possible to deflect the elastic member, move the one split member, and decenter the bearing toward the worm wheel, the distance between the rotation centers can be adjusted easily.

The above and further objects and features of the invention will more fully be apparent from the following detailed description with accompanying drawings.

DETAILED DESCRIPTION OF THE INVENTION

[Embodiment 1]

Figure 1:
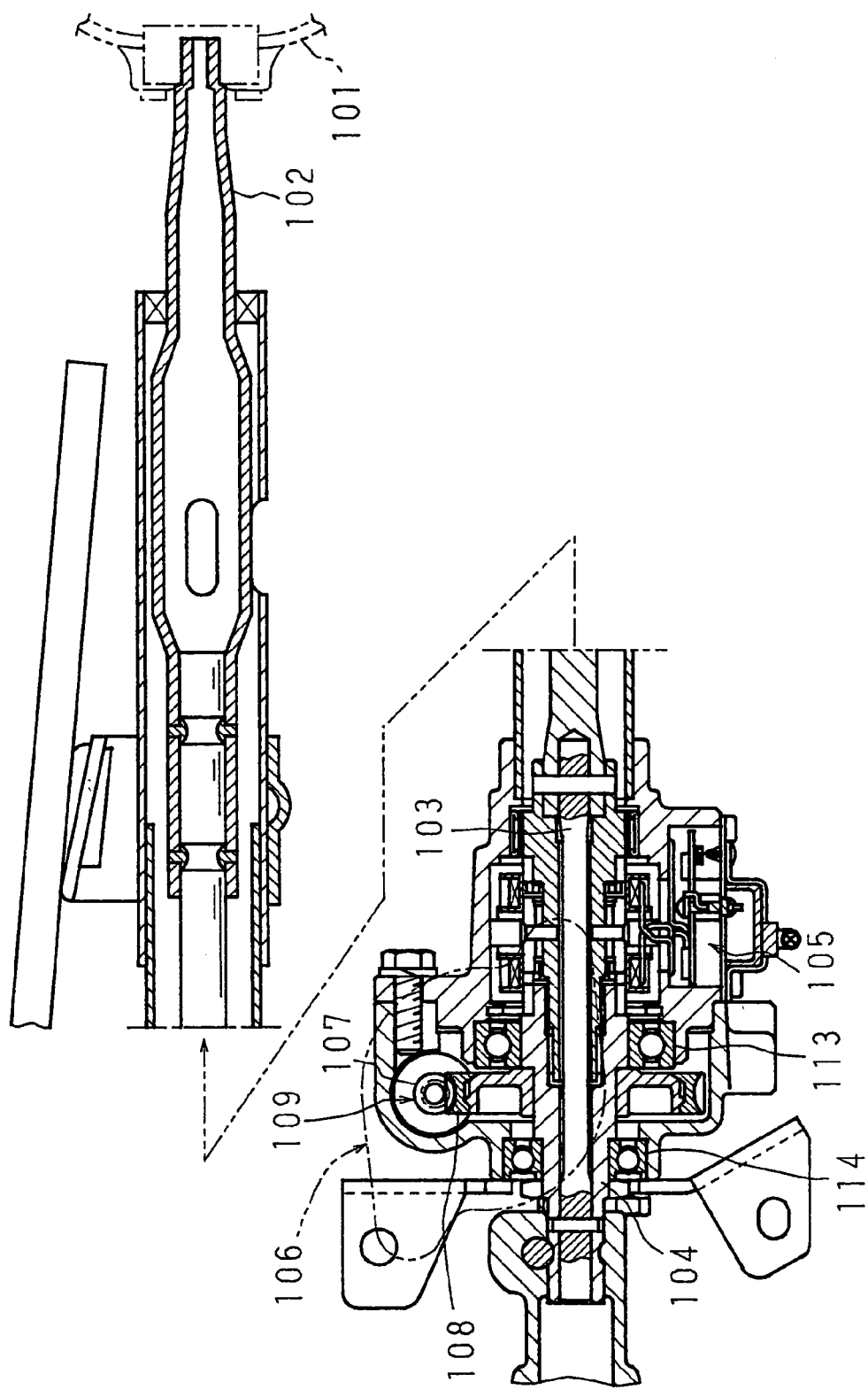
FIG. 1 is a sectional view of an electric power steering apparatus of the prior art.
Figure 2:
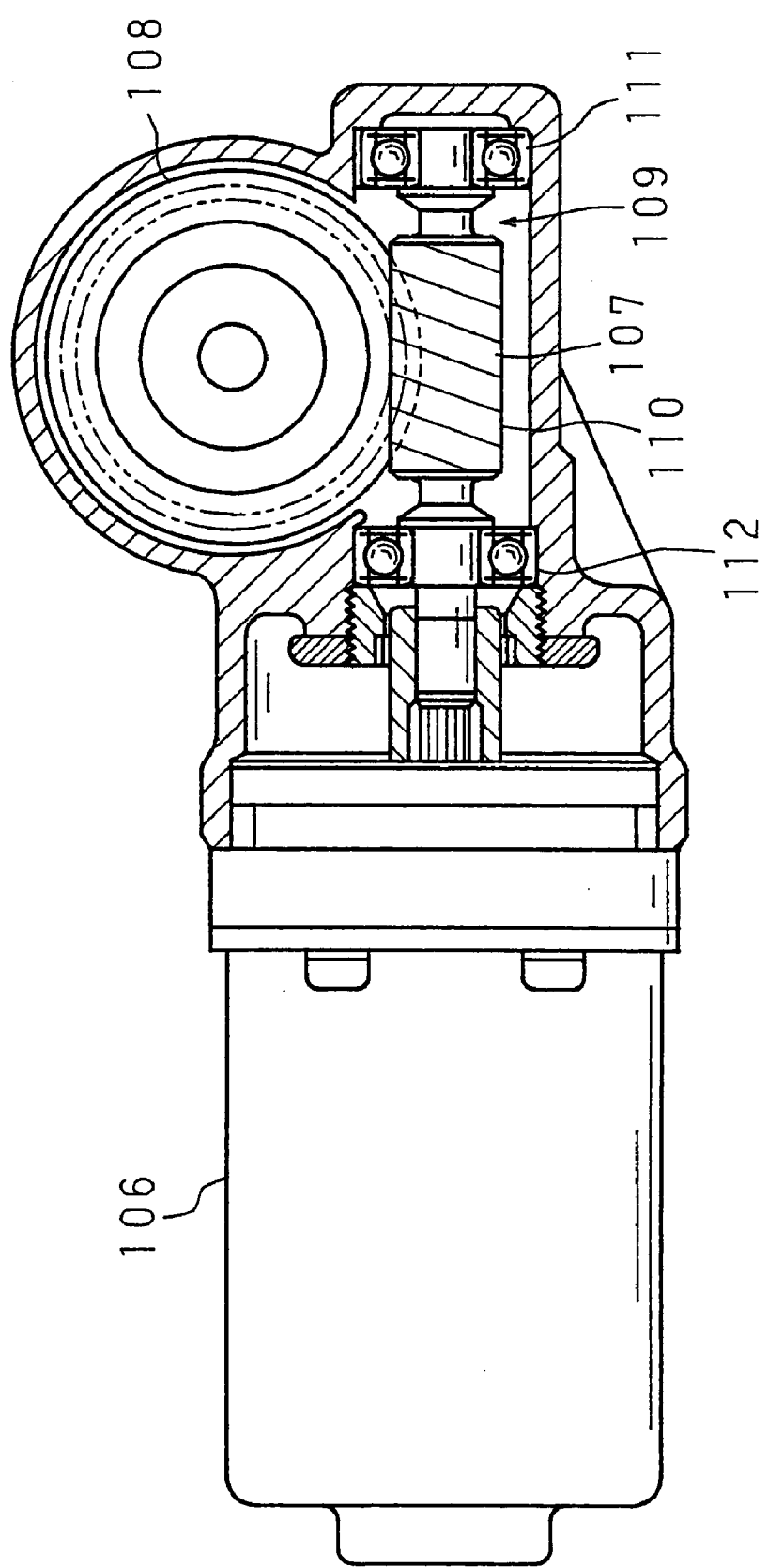
FIG. 2 is a sectional view of a reduction mechanism and a motor portion of the electric power steering apparatus of the prior art.
Figure 3:
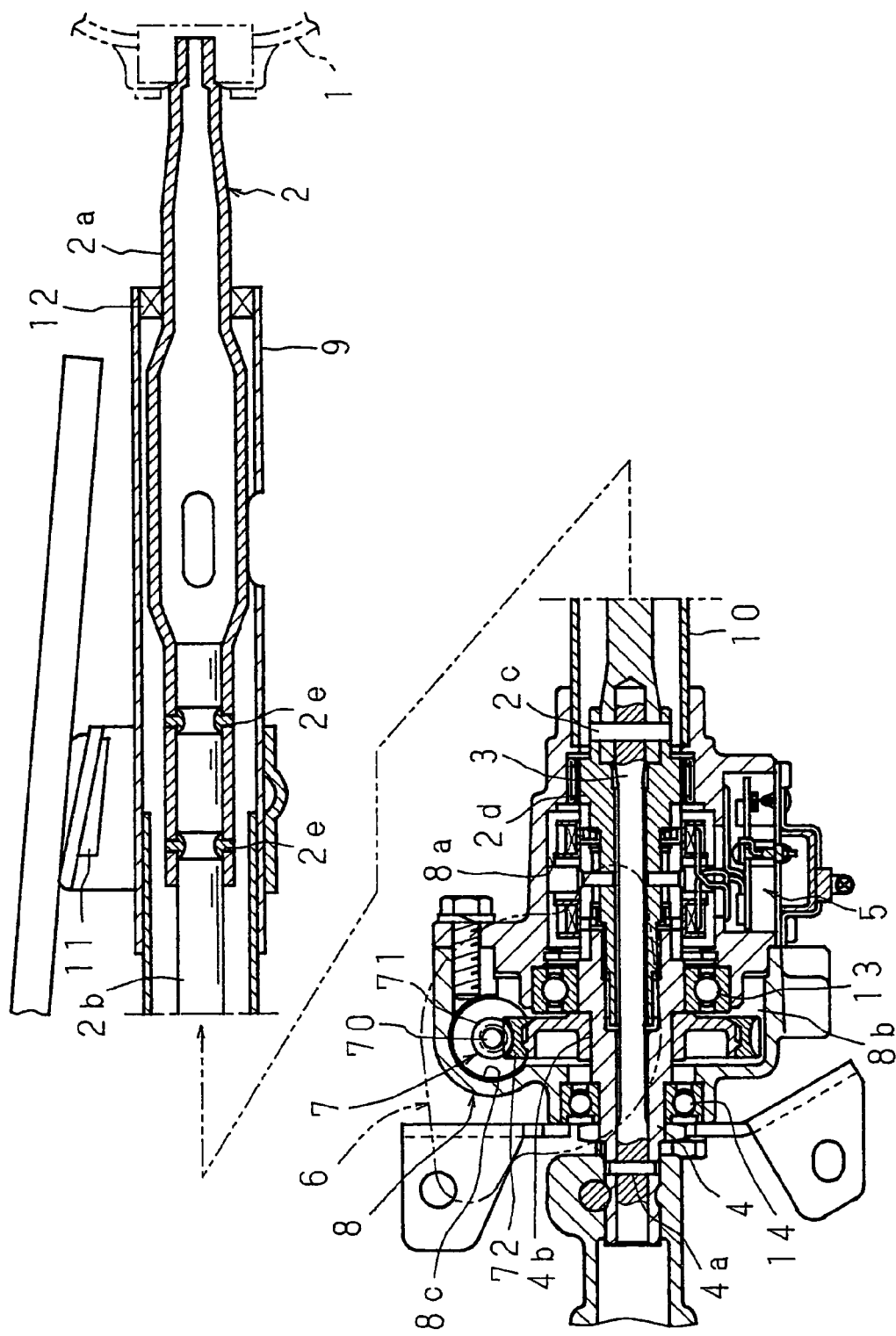
FIG. 3 is a sectional view of the entire electric power steering apparatus according to the present invention.
Figure 4:
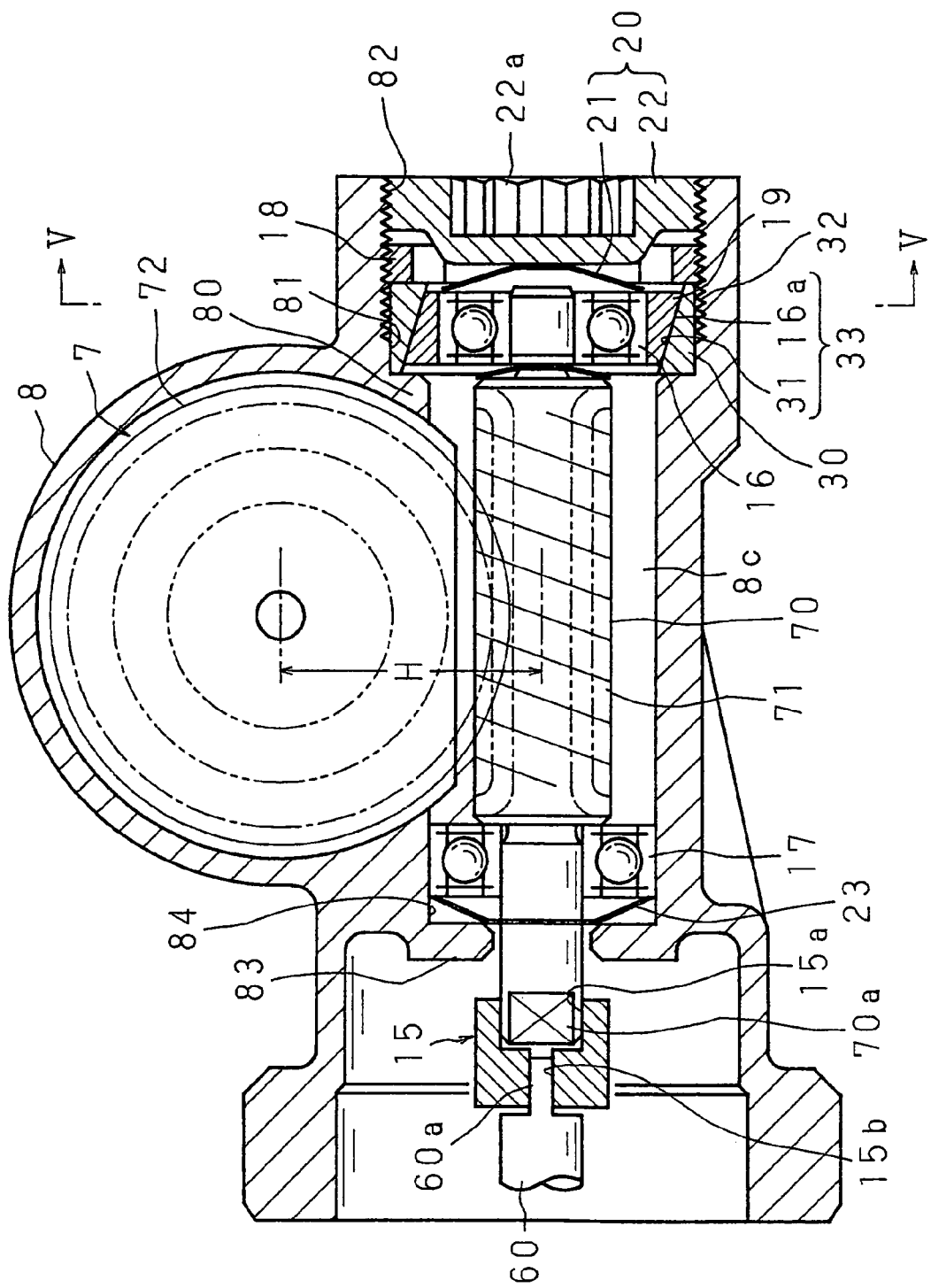
FIG. 4 is a sectional view of a reduction mechanism and a motor portion of the electric power steering apparatus of the invention.

FIG. 3 is a general sectional view of the entire electric power steering apparatus according to the present invention and FIG. 4 is a sectional view of a reduction mechanism and a motor portion.

The electric power steering apparatus includes a first steering shaft 2 connected to a steering wheel 1, a torque sensor 5 for detecting steering torque based on a relative rotational displacement between the first steering shaft 2 and a second steering shaft 4 connected to the first steering shaft 2 through a torsion bar 3, a constant velocity joint (not shown) for transmitting rotation of the second steering shaft 4 to a steering mechanism, the reduction mechanism 7 having a worm 71 and a worm wheel 72 for increasing a rotating force of a steering assisting motor 6 driven based on a detection result of the torque sensor 5 and for transmitting the rotating force to the second steering shaft 4, a first shaft housing 9 and a second shaft housing 10 for surrounding and supporting the first steering shaft 2, a gear housing 8 for housing the torque sensor 5 and the reduction mechanism 7, and a mounting bracket 11 for mounting the first shaft housing 9 to a vehicle body. The motor 6 is mounted to the gear housing 8 and the other end portion of the first shaft housing 9 is fitted with one end portion of the second shaft housing 10 such that the first shaft housing 9 can move in a shaft length direction with respect to the second shaft housing 10.

The first steering shaft 2 includes a cylindrical first shaft member 2a having one end portion mounted with the steering wheel 1 and an intermediate portion supported by the cylindrical first shaft housing 9 through a bearing 12, a bar-shaped second shaft member 2b fitted with the other end portion of the first shaft member 2a such that the second shaft member 2b cannot rotate with respect to the first shaft member 2a and can move in the shaft length direction, and a cylindrical third shaft member 2d connected to the second shaft member 2b through a dowel pin 2c. Between the first shaft member 2a and the second shaft member 2b, shock energy absorbers 2e made of synthetic resin for absorbing shock energy that is applied by the driver and acts on the steering wheel 1 are provided. Between the third shaft member 2d and the second steering shaft 4, the torque sensor 5 is provided.

The second steering shaft 4 is formed into a cylindrical shape and one end portion of the second steering shaft 4 is fitted with one end portion of the torsion bar 3 having another end portion connected to the other end portion of the second shaft member 2b through the dowel pin 2c, and conncected through the dowel pin 4a. An intermediate portion of the second steering shaft 4 in the shaft length direction is rotatably supported by the gear housing 8 through a pair of bearings 13 and 14 and the worm wheel 72 is mounted by fitting to a fitting portion 4b between the bearings 13 and 14.

The second shaft housing 10 has one end portion fitted with the first shaft housing 9 and the other end portion fitted with the gear housing 8. In absorbing the above shock energy, the first shaft housing 9 is moved in the shaft length direction with respect to the second shaft housing 10.

The gear housing 8 includes a first housing portion 8a for housing the torque sensor 5, a second housing portion 8b formed seamlessly with the first housing portion 8a for housing the worm wheel 72, and a third housing portion 8c formed seamlessly with the second housing portion 8b for housing a worm shaft 70 provided with the worm 71. The third housing portion 8c has a through hole. A first fitting hole 81 having a first seat 80 and a screw hole 82 formed seamlessly with the fitting hole 81 are provided on one end side of the third housing portion 8c. A second fitting hole 84 having a smaller diameter than the first fitting hole 81 and having a second seat 83 is provided on the other end side of the third housing portion 8c.

Figure 5:
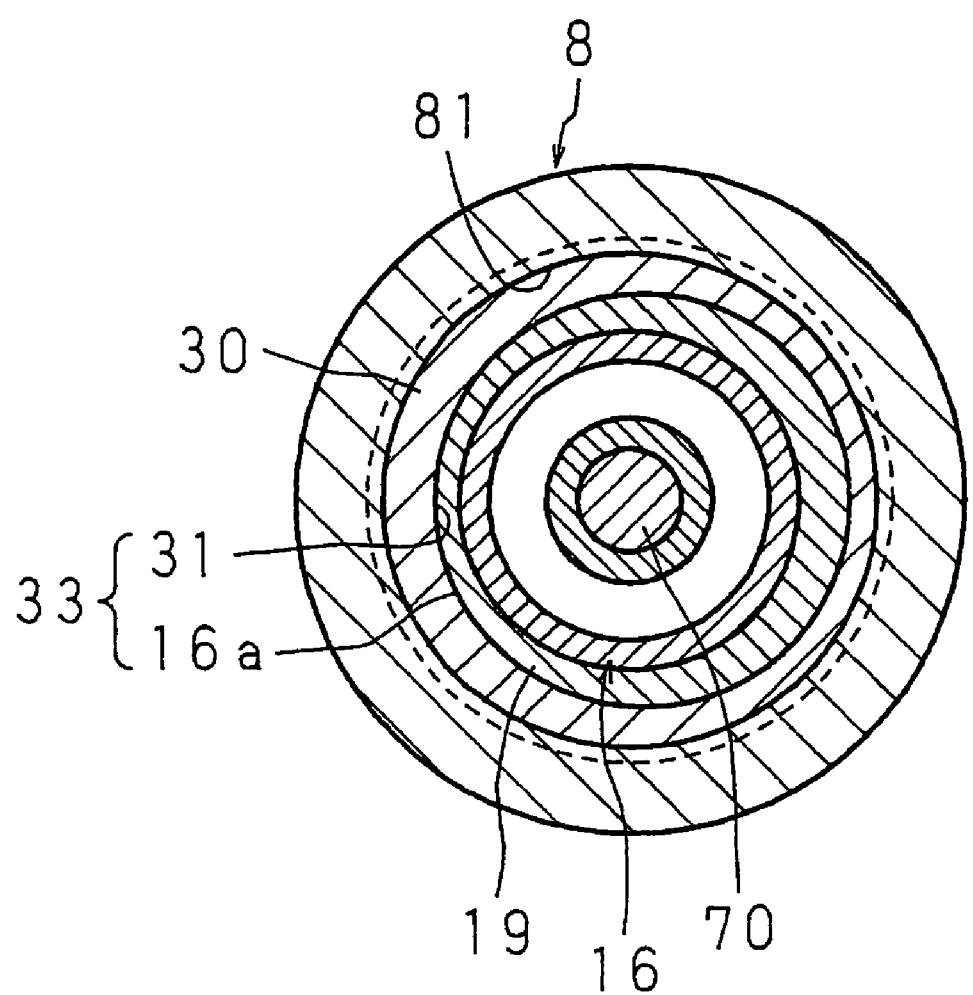
FIG. 5 is a sectional view taken along a line V—V in FIG. 4.

FIG. 5 is a sectional view taken along a line V—V in FIG. 4.

The reduction mechanism 7 has the worm 71 formed integrally with an intermediate portion in the shaft length direction of the worm shaft 70 interlocked with and connected to an output axis 60 of the motor 6 through a universal coupling 15, and the worm wheel 72 made of synthetic resin and fitted with and fixed to the fitting portion 4b of the second steering shaft 4. The worm 71 and the worm wheel 72 mesh with each other to increase rotating force of the motor 6, transmit the force to the second steering shaft 4, and transmit the force to a steering mechanism through the constant velocity joint.

The worm shaft 70 is disposed in the third housing portion 8c to intersect the shaft center of the second steering shaft 4. One end portion in the shaft length direction of the worm shaft 70 is rotatably supported by the first fitting hole 81 of the gear housing 8 through a first bearing 16 using a ball bearing and a ring-shaped bearing case 30 for fitting with and holding the first bearing 16. The other end portion of the worm shaft 70 is rotatably supported by the second fitting hole 84 of the gear housing 8 through a second bearing 17 using a ball bearing. In an intermediate position between the first and second bearings 16 and 17, the worm 71 is integrally provided.

The bearing case 30 is formed into a ring shape having a holding hole 31 for fitting with and holding the first bearing 16, a fitting portion 32 around the holding hole 31 and fitted with the first fitting hole 81, and decentering mechanism 33 for decentering the bearing 16 toward the worm wheel 72. The bearing case 30 is pushed against the first seat 80 by a locknut 18 screwed into the screw hole 82 and fixed to the first fitting hole 81.

The decentering mechanism 33 has the holding hole 31 that is an inclined face inclined toward the worm wheel 72 with respect to the rotation center of the worm shaft 70 and an inclined contact surface 16a coming in contact with the inclined face and provided to an outer peripheral face of a ring member 19 fitted with and fixed to the first bearing 16. The inclined contact surface 16a is provided on the outer peripheral face of the ring member 19 formed separately from the bearing 16, an inner face of the ring member 19 is fitted with and fixed to an outer periphery of the bearing 16, and adjusting mechanism 20 slides the bearing 16 along the inclined face of the decentering mechanism 33.

The adjusting mechanism 20 has an elastic member 21 such as a belleville spring in contact with one end face of an outer rim of the bearing 16 and a disc-shaped adjusting screw 22 screwed into the screw hole 82 for adjusting a deflection amount of the elastic member 21. An outer peripheral face of the adjusting screw 22 is threaded and a recessed tool insertion hole 22a is provided on one side face of the adjusting screw 22. By a tool inserted into the tool insertion hole 22a, the adjusting screw 22 is rotated to adjust the deflection amount of the elastic member 21. Thus, the worm shaft 70 can be moved toward the other side in the shaft length direction through the elastic member 21, the ring member 19, and the bearing 16.

In the second fitting hole 84, an elastic member 23 formed of a belleville spring for energizing the worm shaft 70 toward the first bearing 16 is provided between the bearing 17 and the second seat 83.

The universal coupling 15 has a coupling main body having a noncircular fitting hole 15a on one end and a fitting groove 15b on the other end. A fitting portion 70a corresponding to the fitting hole 15a is provided on the worm shaft 70 and a fitting projection 60a corresponding to the fitting groove 15b is provided on the output axis 60.

In the first embodiment, in order to incorporate the worm shaft 70, the first bearing 16, with and to which the ring member 19 having the inclined contact surface 16a is fitted and fixed, is fitted with the one end portion of the worm shaft 70, the bearing case 30 is fitted with the ring member 19, and the second bearing 17 and the elastic member 23 are fitted with the other end portion of the worm shaft 70. In this state, the other end side of the worm shaft 70 is firstly inserted into the third housing portion 8c. At this time, the second bearing 17 is fitted with the second fitting hole 84, the bearing case 30 is fitted with the first fitting hole 81, the elastic member 23 comes in contact with the second seat 83, and the bearing case 30 comes in contact with the first seat 80.

After inserting the worm shaft 70 into the third housing portion 8c, the locknut 18 is screwed into the screw hole 82 to fix the bearing case 30 to the first fitting hole 81. Then, the elastic member 21 is inserted into the screw hole 82, the adjusting screw 22 is screwed into the screw hole 82, the elastic member 21 is deformed elastically by screwing up the adjusting screw 22, and the ring member 19 and the first bearing 16 are pressurized toward the other side in the shaft length direction. In this case, because the first bearing 16 moves along the inclined face of the bearing case 30, it is possible to decenter the worm shaft 70 toward the worm wheel 72 and to adjust the distance H between the rotation centers of the worm shaft 70 and the worm wheel 72.

Therefore, in incorporating the worm shaft 70, it is possible to easily set the distance H between the rotation centers without being influenced by dimensional errors of parts such as the worm shaft 70. Because of a simple structure in which the holding hole 31 of the bearing case 30 is inclined and the inclined contact surface 16a is provided on the ring member 19, it is possible to simplify the structure of the decentering mechanism 33.

Because the elastic member 21 pressurizes the ring member 19 and the first bearing 16 toward the other side in the shaft length direction, the distance H between the rotation centers can be adjusted automatically by force of the elastic member 21 when the meshing state of the worm 71 and the worm wheel 72 changes with time due to increase in wearing amounts of cogs of the worm 71 and the worm wheel 72 or contraction of the worm wheel 72 made of synthetic resin as a result of low temperatures during wintertime and the like.

In this case, if the distance H between the rotation centers cannot be adjusted satisfactorily by only the force of the elastic member 21, the adjusting screw 22 is screwed up to adjust the deflection amount of the elastic member 21 and to decenter the second bearing 17 toward the worm wheel 72, thereby satisfactorily adjusting the distance H between the rotation centers. Because the worm shaft 70 is interlocked with and connected to the output axis 60 of the motor 6 through the universal coupling 15, the distance H between the rotation centers can be adjusted satisfactorily if an amount of decentering of the worm shaft is larger.

Because the elastic member 23 for energizing the worm shaft 70 toward the first bearing 16 is provided on the second bearing 17 side, it is possible to satisfactorily prevent rattling of the worm shaft 70 in the shaft length direction in adjusting the distance H between the rotation centers.

Although the inclined contact surface 16a is provided on the ring member 19 fitted with and fixed to the first bearing 16 in the above-described first embodiment, the inclined contact surface 16a may be provided directly on the outer rim of the first bearing 16. If the inclined contact surface 16a is provided on a decentering member fixed to the first bearing 16, the decentering member may be the above-described ring member or in a shape other than the ring member that can be provided with the inclined contact surface 16a.

[Embodiment 2]

Figure 6:
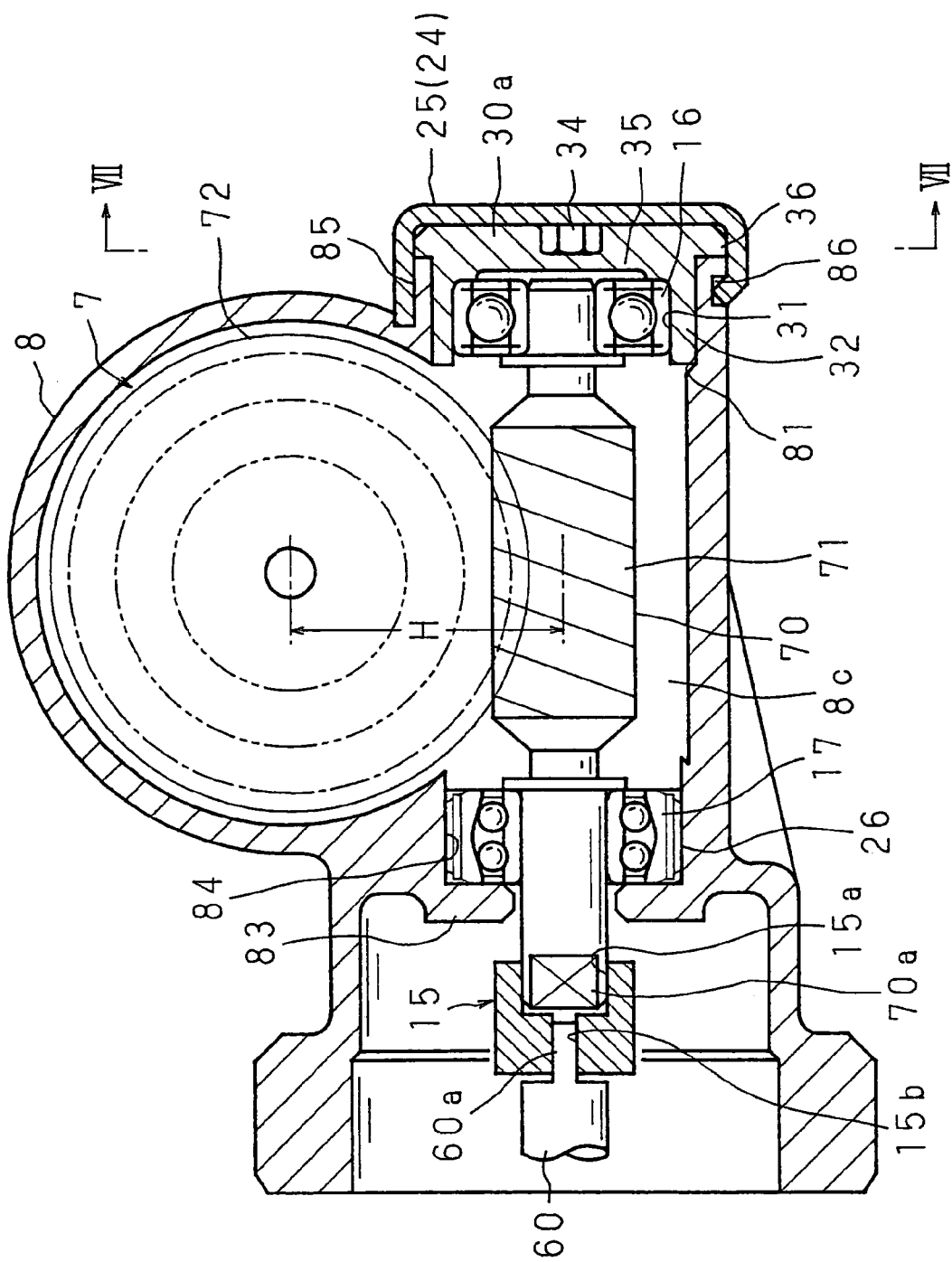
FIG. 6 is a sectional view of a reduction mechanism and a motor portion in a second embodiment of the electric power steering apparatus according to the invention.
Figure 7:
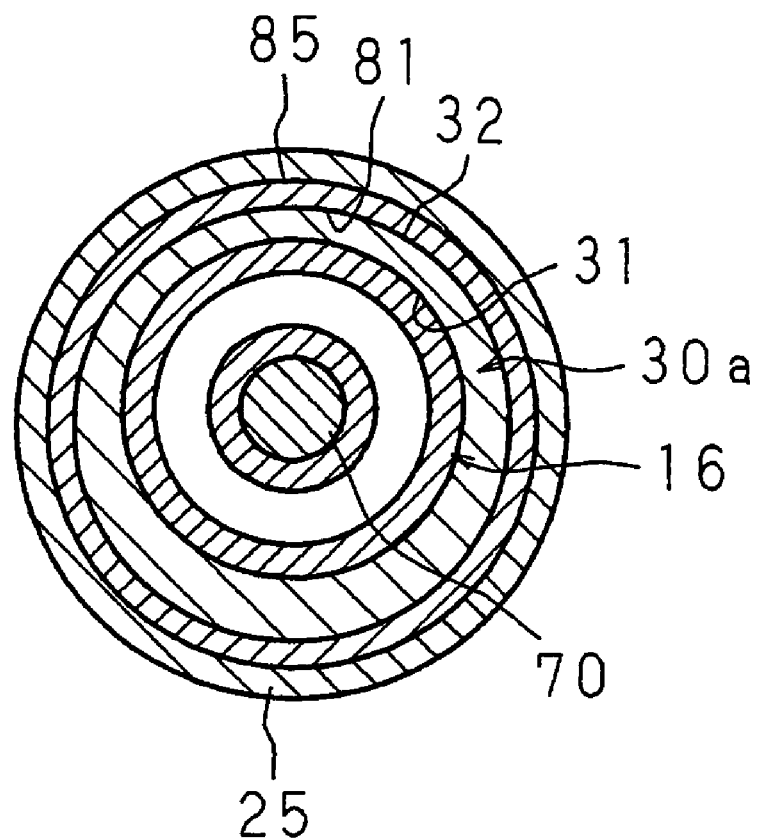
FIG. 7 is a sectional view taken along a line VII—VII in FIG. 6.

FIG. 6 is a sectional view of a reduction mechanism and a motor portion in the embodiment 2 and FIG. 7 is a sectional view taken along a line VII—VII in FIG. 6.

In an electric power steering apparatus of the embodiment 2, instead of forming the holding hole 31 of the bearing case 30 into the inclined face, providing a bearing case 30a having a fitting portion 32 rotatably fitted with the first fitting hole 81 of the gear housing 8 around the holding hole 31 to decenter the holding hole 31 from the center of the fitting portion 32, and position retaining means 24 for retaining the position of the bearing case 30a. Because other structures and operations are similar to those in the embodiment 1, common parts are provided with similar reference numerals or characters to omit detailed descriptions and operations of the parts.

The gear housing 8 of the embodiment 2 does not have the first seat 80 and the screw hole 82 and has first and second fitting holes 81 and 84. Around the first fitting hole 81, a fitting portion 85 and a recessed portion 86 recessed corresponding to the fitting portion 85 are provided.

The bearing case 30a has a closing portion 35 for closing one end of the holding hole 31 and provided at the center portion of the closing portion 35 with a recessed tool insertion hole 34, and an annular flange portion 36 extending radially outward from an outer periphery of the closing portion 35 further than the fitting portion 32. When the fitting portion 32 is rotatably fitted with the first fitting hole 81, the flange portion 36 comes in contact with an end edge of the fitting hole 81 to determine a position of the bearing case 30a. By rotating the bearing case 30a by using a tool inserted into the tool insertion hole 34, a position of the bearing 16 is changed toward the worm wheel 72, thereby adjusting the distance H between the rotation centers.

The position retaining means 24 is formed by using a bowl-shaped cover member 25 for housing the flange portion 36 of the bearing case 30a. An open portion of the cover member 25 is fitted with the fitting portion 85 of the gear housing 8 and an end edge of the open portion is caulked toward an inside of the recessed portion 86 to push the flange portion 36 against an end edge of the fitting hole 81, thereby to restrict rotation of the bearing case 30a, and to retain the position of the bearing case 30a.

As a first bearing 16, a four point contact ball bearing having the contact face with the balls at two points on an inner side and at two points on an outer side is used. As a second bearing 17, a self-aligning ball bearing is used and a ring-shaped elastic member 26 formed into a wave shape, i.e., a serration shape is provided between an outer peripheral face of the bearing 17 and the second fitting hole 84 through an entire circumference. The elastic member 26 is formed of a metal plate, for example.

In the embodiment 2, in order to incorporate the worm shaft 70, the first bearing 16 is fitted with the one end portion of the worm shaft 70, the bearing case 30a is fitted with the bearing 16, the second bearing 17 is fitted with the other end portion of the worm shaft 70, and the elastic member 26 is fitted with the bearing 17. In this state, the other end side of the worm shaft 70 is firstly inserted into the third housing portion 8c. At this time, the elastic member 26 is fitted with the second fitting hole 84 and the fitting portion 32 of the bearing case 30a is fitted with the first fitting hole 81.

After inserting the above worm shaft 70 into the third housing portion 8c, a position of the bearing 16 is changed by rotating the bearing case 30a, thereby decentering the worm shaft 70 fitted with the bearing 16 toward the worm wheel 72 and adjusting the distance H between the rotation centers of the worm shaft 70 and the worm wheel 72.

Therefore, in incorporating the worm shaft 70, it is possible to easily set the distance H between rotation centers without being influenced by dimensional errors of parts such as the worm shaft 70. Because a four point contact ball bearing is used for the first bearing 16, it is possible to satisfactorily prevent rattling of the worm shaft 70 in the shaft length direction without providing the elastic member 21 for energizing the worm shaft 70 in the shaft length direction like in the embodiment 1.

Because a self-aligning ball bearing is used for the second bearing 17, in adjusting the distance H between the rotation centers by using the bearing case 30a, it is possible to increase an amount of adjustment as compared with a case in which a non-self-aligning ball bearing is used. Because the ring-shaped elastic member 26 is provided on the outer peripheral portion of the second bearing 17, run outs of the worm wheel 72 can be absorbed satisfactorily. Furthermore, because the elastic member 26 can be deflected in adjusting the distance H between the rotation centers by using the bearing case 30a, it is possible to satisfactorily absorb a change in the meshing state by the deflection amount of the elastic member 26 when the meshing state of the worm 71 and the worm wheel 72 changes with time due to wearing of cogs of the worm 71 and the worm wheel 72 or contraction of the worm wheel 72 made of synthetic resin as a result of low temperatures during wintertime and the like.

In the embodiment 2, because the position retaining means 24 for retaining the position of the bearing case 30a has a structure in which the bowl-shaped cover member 25 is caulked, the bearing case 30a cannot be rotated after assembly. However, it is also possible to employ a structure in which a thread portion is formed on the fitting portion 85 to screw the cover member 25 to the thread portion or a structure in which a locknut is held on an outer periphery of the cover member 25 to screw the locknut to the thread portion such that the bearing case 30a can be rotated after assembly and the structure of the position retaining means 24 is not especially limited. If the latter structure is employed such that the bearing case 30a can be rotated after assembly, it is possible to adjust the distance H between the rotation centers by rotating the bearing case 30a when the meshing state changes with time.

[Embodiment 3]

Figure 8:
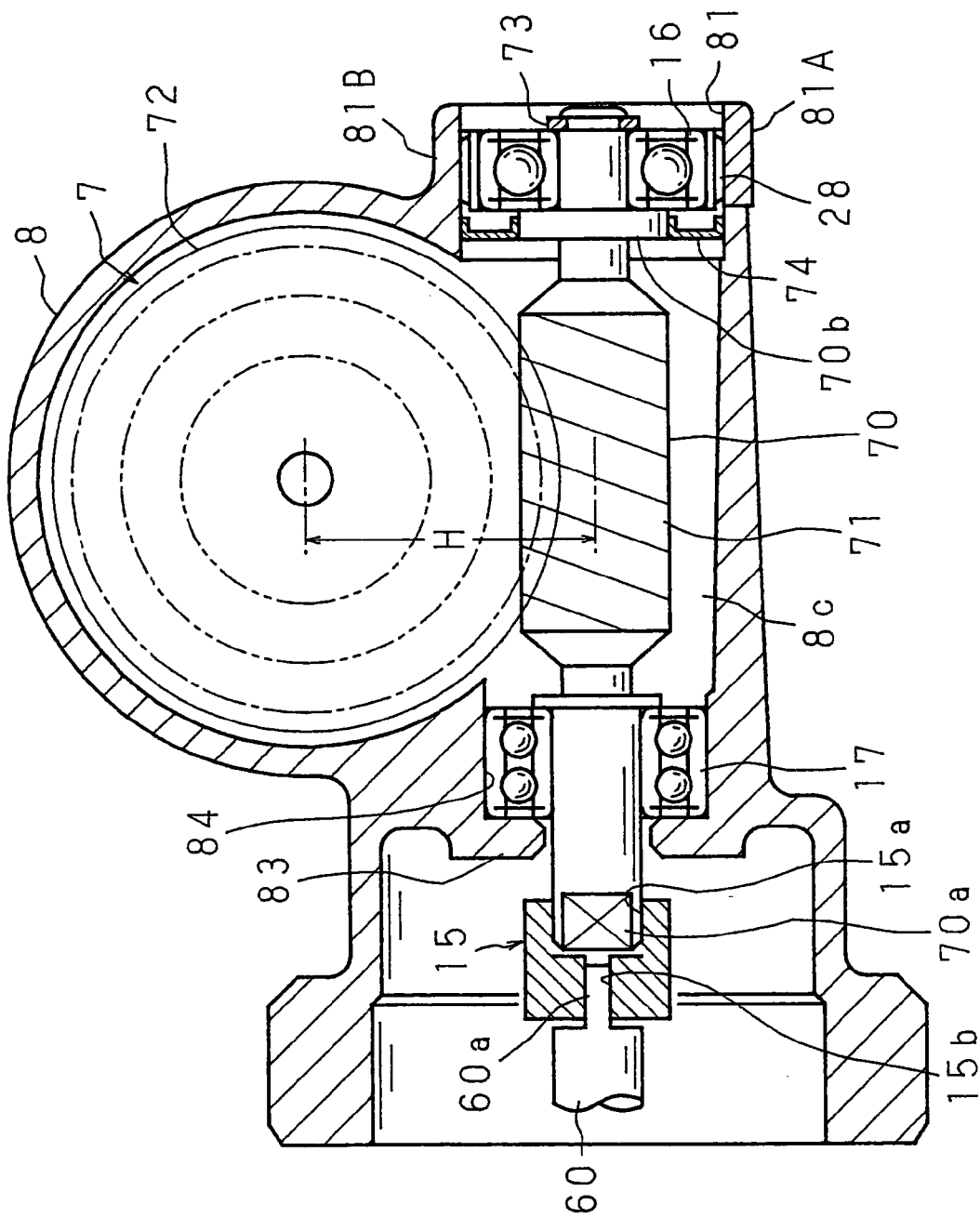
FIG. 8 is a sectional view of a reduction mechanism and a motor portion in a third embodiment of the electric power steering apparatus according to the invention.
Figure 9:
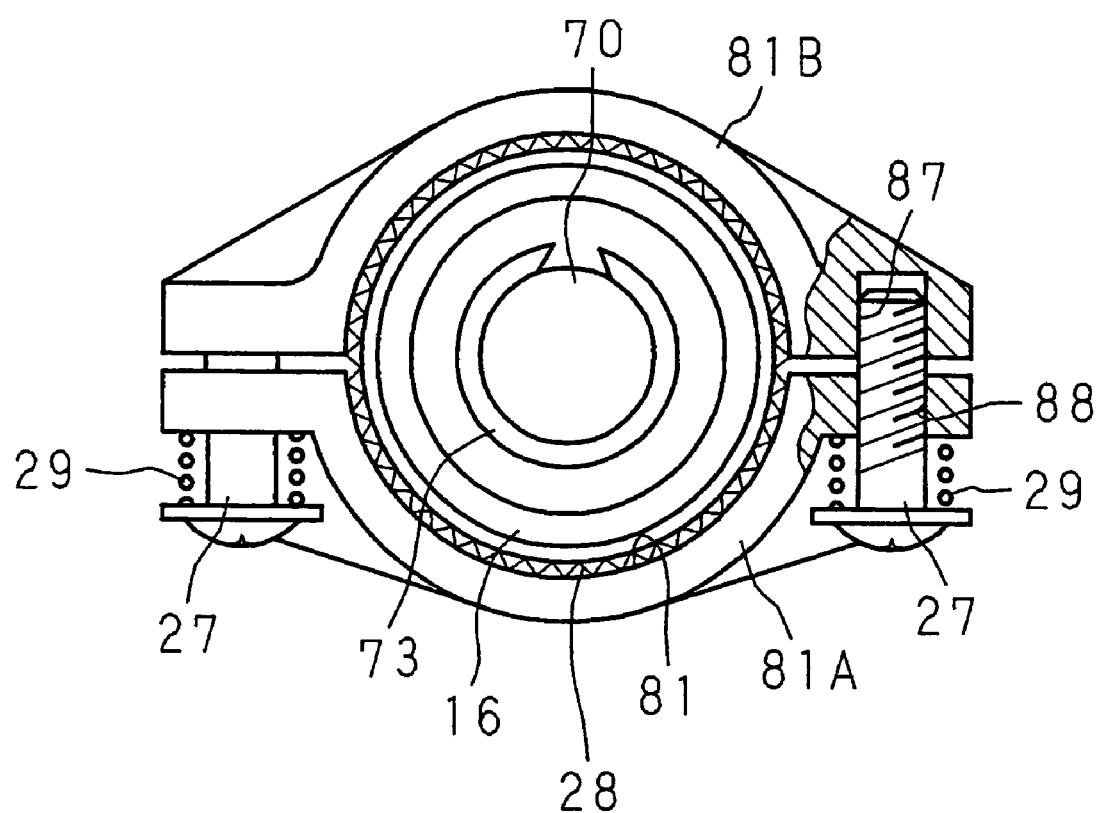
FIG. 9 is a side view of the third embodiment of the electric power steering apparatus according to the invention.

FIG. 8 is a sectional view of a reduction mechanism and a motor portion in the embodiment 3 and FIG. 9 is a side view.

In an electric power steering apparatus of the embodiment 3, instead of using the bearing case 30, 30a like in the embodiments 1 and 2, a hole portion of a first fitting hole 81 of a gear housing 8 with which the first bearing 16 is fitted is split along a longitudinal direction of the fitting hole 81. One split member 81A can be moved toward the worm wheel 72 with respect to the other split member 81B. A pair of clamp screws (displacement member) 27, 27 for displacing the one split member 81A and a ring-shaped elastic member 28 between semicircular fitting hole portions of the split members 81A and 81B and an outer peripheral face of the bearing 16 are provided. Because other structures and operations are similar to those in the embodiment 2, common parts are provided with similar reference numerals or characters to omit detailed descriptions and operations of the parts.

The hole portion of the first fitting hole 81 is split through the center into two parts on a worm wheel 72 side and on a side opposite to the worm wheel. Screw holes 87, 87 are provided on opposite sides in a curve direction of the semicircular fitting hole portion of the other split member 81B on the worm wheel side. Through holes 88, 88 corresponding to the screw holes 87, 87 are provided on opposite sides in a curve direction of the semicircular fitting hole portion of the one split member 81A on the side opposite to the worm wheel. By screwing the clamp screws 27, 27 inserted into the through holes 88, 88 into the screw holes 87, 87, the one split member 81A is moved toward the worm wheel 72. By this movement, the elastic member 28 is deflected through the bearing 16 to decenter the worm shaft 70 together with the bearing 16 toward the worm wheel 72.

Coil springs 29, 29 having elastic recovery force greater than that of the elastic member 28 are wound around shaft portions of the clamp screws 27, 27 on sides where rotating operations are carried out. When the respective clamp screws 27, 27 are screwed up, the respective coil springs 29, 29 are deflected. When the meshing state of the worm 71 and the worm wheel 72 changes with time due to wearing of cogs of the worm 71 and the worm wheel 72 or contraction of the worm wheel 72 made of synthetic resin as a result of low temperatures during wintertime and the like, it is possible to satisfactorily absorb a change in the meshing state by deflecting the elastic member 28 by the elastic recovery force of the coil springs 29, 29.

The elastic member 28 is formed into a wave shape, i.e., a serration shape through an entire circumference. The elastic member 28 is formed of a metal plate, for example.

A flange portion 70b and a snap ring 73 for restraining movement of the bearing 16 are provided on one end portion of the worm shaft 70, and a ring-shaped dust cover 74 is provided between an outer peripheral face of the flange portion 70b and the fitting hole 81.

A double-row angular contact ball bearing is used for the second bearing 17.

In the embodiment 3, in order to incorporate the worm shaft 70, the clamp screws 27, 27 are loosened to widen a gap between the split members 81A and 81B to such an extent that the elastic member 28 can be inserted into the gap, for example. Then, the first bearing 16 is fitted with the one end portion of the worm shaft 70, the elastic member 28 is fitted with the bearing 16, and the second bearing 17 is fitted with the other end portion of the worm shaft 70. In this state, the other end side of the worm shaft 70 is firstly inserted into the third housing portion 8c. At this time, the elastic member 28 is fitted with the semicircular fitting portions of the split members 81A and 81B.

After the worm shaft 70 is inserted into the third housing portion 8c, the one split member 81A is moved toward the worm wheel 72 by screwing up the clamp screws 27, 27. By this movement, the position of the bearing 16 is changed and the elastic member 28 is deflected to decenter the worm shaft 70 fitted with the bearing 16 toward the worm wheel 72, thereby adjusting the distance H between the rotation centers of the worm shaft 70 and the worm wheel 72.

Therefore, in incorporating the worm shaft 70, it is possible to easily set the distance H between the rotation centers without being influenced by dimensional errors of parts such as the worm shaft 70.

Because the coil springs 29, 29 pressurize the one split member 81A toward the worm wheel 72, the distance H between the rotation centers can be adjusted automatically by the elastic recovery force of the coil springs 29, 29 when the meshing state of the worm 71 and the worm wheel 72 changes due to increase in wearing amounts of cogs of the worm 71 and the worm wheel 72 or contraction of the worm wheel 72 made of synthetic resin as a result of low temperatures during wintertime and the like.

In this case, if the distance H between the rotation centers cannot be adjusted satisfactorily only by the force of the coil springs 29, 29, it is possible to satisfactorily adjust the distance H between the rotation centers by screwing up the clamp screws 27, 27 to adjust the elastic recovery force of the coil springs 29, 29 and to decenter the first bearing 16 toward the worm wheel 72.

Because a double-row angular contact ball bearing is used for the second bearing 17, it is possible to satisfactorily prevent rattling of the worm shaft 70 in the shaft length direction in adjusting the distance H between the rotation centers.

In the embodiment 3, the elastic member 28 may be in a semicircular shape, for example, in addition to the ring shape and may be provided between the other split member 81B and the outer peripheral face of the bearing 16.

In the embodiments 2 and 3, the elastic members 26 and 28 may be made of material such as rubber, synthetic resin, and the like having elasticity in addition to a metal plate formed into the wave shape. In this case, each of the elastic members 26 and 28 may have a structure in which a plurality of projections are provided on a surface of an arcuate sheet portion in addition to the structure formed into the wave shape.

In the embodiments 2 and 3, the worm shaft 70 is interlocked with and connected to the output axis 60 of the motor 6 through the universal coupling 15 similarly to the embodiment 1.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An electric power steering apparatus for transmitting rotating force of a steering assisting motor to a worm shaft having a worm and being rotatably supported in a gear housing through a bearing and to a steering shaft provided with a worm wheel meshing with said worm and for assisting steering, said apparatus comprising:
    a fitting hole portion of said gear housing for fitting with and holding said bearing, the portion being formed of first and second split members formed by splitting said portion into two along a longitudinal direction of said fitting hole, the first and second split members being separated by a gap, the first split member being movable toward said worm wheel with respect to the second split member and a position of the second split member being fixed;
    a member for displacing said first split member toward the second split member in order to reduce the size of the gap and adjust the meshing state of said worm shaft supported by said bearing; and
    an elastic member provided between the second split member and said bearing, the elastic member being in contact with said second split member and said bearing,
    wherein said displacement member has a member for connecting said pair of split members, and an energizing member disposed between said connecting member and said first split member and having elastic recovery force greater than an elastic recovery force of said elastic member.

2. An electric power steering apparatus according to claim 1, wherein said connecting member is a clamp screw.

3. An electric power steering apparatus according to claim 1, wherein said worm shaft is connected to an output axis of said motor through a universal coupling.

* * * * *